United States Patent
Duge

(10) Patent No.: US 11,261,791 B2
(45) Date of Patent: Mar. 1, 2022

(54) HYBRID PROPULSION COOLING SYSTEM

(71) Applicant: Rolls-Royce Corporation, Indianapolis, IN (US)

(72) Inventor: Robert T. Duge, Carmel, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 269 days.

(21) Appl. No.: 16/284,823

(22) Filed: Feb. 25, 2019

(65) Prior Publication Data

US 2020/0271075 A1  Aug. 27, 2020

(51) Int. Cl.
| | |
|---|---|
| F02C 7/12 | (2006.01) |
| F02C 7/18 | (2006.01) |
| F02C 6/16 | (2006.01) |
| F02K 3/02 | (2006.01) |
| F02K 7/14 | (2006.01) |
| F02K 7/16 | (2006.01) |
| F01D 25/14 | (2006.01) |
| F01D 25/26 | (2006.01) |

(52) U.S. Cl.
CPC ............... *F02C 7/125* (2013.01); *F02C 6/16* (2013.01); *F02C 7/18* (2013.01); *F02K 3/025* (2013.01); *F02K 7/14* (2013.01); *F01D 25/145* (2013.01); *F01D 25/26* (2013.01); *F02K 7/16* (2013.01)

(58) Field of Classification Search
CPC .... F02C 6/16; F02C 6/02; F02C 7/042; F02C 7/057; F02C 7/125; B63H 2021/207; F01K 17/025; F01K 23/16; B64D 27/10–14; B64D 29/00–08; B64D 2033/0213; B64D 2041/002; F05D 2220/50

See application file for complete search history.

(56) References Cited

U.S. PATENT DOCUMENTS

| | | |
|---|---|---|
| 2,955,414 A | 10/1960 | Hausmann |
| 3,282,052 A | 11/1966 | Lagelbauer |
| 3,980,233 A | 9/1976 | Simmons et al. |
| 4,275,857 A | 6/1981 | Bergsten |
| 4,754,922 A | 7/1988 | Halvorsen et al. |

(Continued)

OTHER PUBLICATIONS

Buchmann, O.A., "Design and Analysis of a Scramjet Engine", dated Jan. 1, 1978, pp. 66-117, AiResearch Manufacturing Company, Los Angeles, California, available at: https://ntrs.nasa.gov/search.jsp?R=19790013255.

*Primary Examiner* — Stephanie Sebasco Cheng
(74) *Attorney, Agent, or Firm* — Crowell & Moring LLP

(57) ABSTRACT

A hybrid propulsion system is provided. The system may comprise a gas turbine engine and a secondary engine, an inlet, an exhaust, a pressurized tank, and an expansion valve. The inlet may be in fluid communication with the ambient environment. The gas turbine engine may have a core passage including a compressor, a combustion chamber, and a turbine. The core passage may be in selective fluid communication with the inlet. The exhaust may be in fluid communication with the ambient environment and the core passage. The pressurized tank may be located upstream of the core passage. The pressurized tank may contain a cooling fluid. The expansion valve may be in fluid communication with the pressurized tank and the core passage. The pressurized tank may provide cooling fluid to the core passage to cool the gas turbine engine during operation of the secondary engine.

16 Claims, 7 Drawing Sheets

(56) References Cited

U.S. PATENT DOCUMENTS

| | | |
|---|---|---|
| 4,782,659 A | 11/1988 | Lewis et al. |
| 4,835,962 A | 6/1989 | Rutter |
| 4,909,031 A | 3/1990 | Grieb |
| 4,919,364 A | 4/1990 | John et al. |
| 4,934,632 A | 6/1990 | Kim |
| 5,044,559 A | 9/1991 | Russell et al. |
| 5,058,377 A | 10/1991 | Wildner |
| 5,076,052 A | 12/1991 | Wildner |
| 5,094,070 A | 3/1992 | Enderle |
| 5,284,014 A | 2/1994 | Brossier et al. |
| 5,343,695 A | 9/1994 | Pascal et al. |
| 5,347,807 A | 9/1994 | Brossier et al. |
| 5,379,583 A | 1/1995 | Zickwolf, Jr. |
| 5,586,735 A | 12/1996 | Falempin et al. |
| 5,605,287 A | 2/1997 | Mains |
| 5,694,768 A | 12/1997 | Johnson et al. |
| 5,761,907 A | 6/1998 | Pelletier et al. |
| 5,799,872 A | 9/1998 | Nesbitt et al. |
| 6,076,356 A | 6/2000 | Pelletier |
| 6,622,488 B2 | 9/2003 | Mansour et al. |
| 7,168,236 B2 | 1/2007 | Schmotolocha et al. |
| 7,216,474 B2 | 5/2007 | Bulman et al. |
| 7,762,077 B2 | 7/2010 | Pederson et al. |
| 7,882,695 B2 | 2/2011 | Roberge |
| 8,429,893 B2 | 4/2013 | Rupp et al. |
| 8,661,824 B2 | 3/2014 | Pelletier et al. |
| 9,103,280 B2 | 8/2015 | Rupp et al. |
| 9,109,539 B2 | 8/2015 | Duge et al. |
| 9,752,453 B2 | 9/2017 | Rupp et al. |
| 9,915,201 B2 * | 3/2018 | Karam .................... F02C 3/305 |
| 10,233,867 B2 | 3/2019 | Lovett |
| 10,927,708 B2 | 2/2021 | Metzger |
| 10,968,825 B2 * | 4/2021 | Mackin ................. F02C 7/36 |
| 2005/0081509 A1 | 4/2005 | Johnson |
| 2016/0326915 A1 | 11/2016 | Baladi |
| 2019/0186299 A1 | 6/2019 | Leroux et al. |
| 2020/0025082 A1 | 1/2020 | Karam et al. |

* cited by examiner

HYBRID PROPULSION COOLING SYSTEM

BACKGROUND

Combustion engines typically have cooling systems to maintain components of the engine at safe temperatures during operation. Without a cooling system, the temperature of a component may rise sufficiently high to have adverse effects on the material properties of the materials from which the engine is made. For example, a metal alloy may have a lower strength at higher temperatures or electrical insulation may become brittle.

Upon shutdown, the active systems that cool the engine may also be shut down. For example, a gas turbine engine may be cooled by the flow of air during operation. When the gas turbine engine is shutdown, the flow of air over the engine is substantially reduced and may be negligible. Thermal soak back may occur in an engine during a shutdown period because the heat within the engine is transferred into the surrounding air at a lower rate. During thermal soak back, heat may be transferred, or soak, from engine components that are maintained at higher temperatures during normal operations to other components maintained at lower temperatures. For example, heat from the turbine and/or combustor section may soak toward components like fuel injectors, electrical wiring, etc. After a typical gas turbine engine, this heat soak is eventually released into the ambient environment via natural convention and thermal radiation.

During normal operations, the rotational energy of a gas turbine engine may be converted into electric energy using a generator mechanically coupled to the rotating turbine. When a gas turbine engine is shutdown, the engine no longer produces electrical energy. After shutdown of the gas turbine engine, electrical energy is typically provided by batteries, auxiliary power units, or from ground support systems.

SUMMARY

According to some aspects of the present disclosure, a hybrid propulsion system is provided. The system may comprise a gas turbine engine and a secondary engine, an inlet, an exhaust, a pressurized tank, and an expansion valve. The inlet may be in fluid communication with the ambient environment. The gas turbine engine may have a core passage including a compressor, a combustion chamber, and a turbine. The core passage may be in selective fluid communication with the inlet. The exhaust may be in fluid communication with the ambient environment and the core passage. The pressurized tank may be located upstream of the core passage. The pressurized tank may contain a cooling fluid. The expansion valve may be in fluid communication with the pressurized tank and the core passage. The pressurized tank may provide cooling fluid to the core passage to cool the gas turbine engine during operation of the secondary engine.

According to some aspects of the present disclosure, a hybrid propulsion system, is provided. The system may comprise a secondary engine, a gas turbine engine, an inlet, an exhaust, a pressurized tank, and an expansion valve. The inlet may be in fluid communication with the ambient environment. The gas turbine engine may have a core passage including a compressor, combustion chamber, and a turbine. The core passage may be in selective fluid communication with inlet. The exhaust may be in fluid communication with the ambient environment and the core passage. The pressurized tank may comprise a cooling fluid. The expansion valve may be in fluid communication with the pressurized tank and the core passage via a fluid conduit. Cooling fluid may flow from the pressurized tank to the core passage via the cooling fluid conduit and expansion valve during operation of the secondary engine. The cooling fluid may expand through and rotate the turbine. The cooling fluid may cool the gas turbine engine. The rotation of the turbine may generate electricity.

According to some aspects of the present disclosure, a method of operating a hybrid propulsion system is provided. The method may comprise providing thrust to an aircraft via a gas turbine engine, switching the provision of thrust from the gas turbine engine to a secondary engine, restricting the airflow through the gas turbine engine, providing a cooling fluid from a pressurized tank to the gas turbine engine, impinging the gas turbine engine with the cooling fluid to cool the gas turbine engine, expanding the cooling fluid through a turbine to rotate the turbine, converting the rotation of the turbine into electric energy while the secondary engine is providing thrust to the aircraft, and exhausting the cooling fluid to an ambient environment. The method may further comprise heating the cooling fluid prior to its expansion through the turbine. The method may further comprise sorting the cooling fluid in an isolating mechanism that may restrict airflow through the gas turbine engine.

BRIEF DESCRIPTION OF THE DRAWINGS

The following will be apparent from elements of the figures, which are provided for illustrative purposes.

Figure 1A:
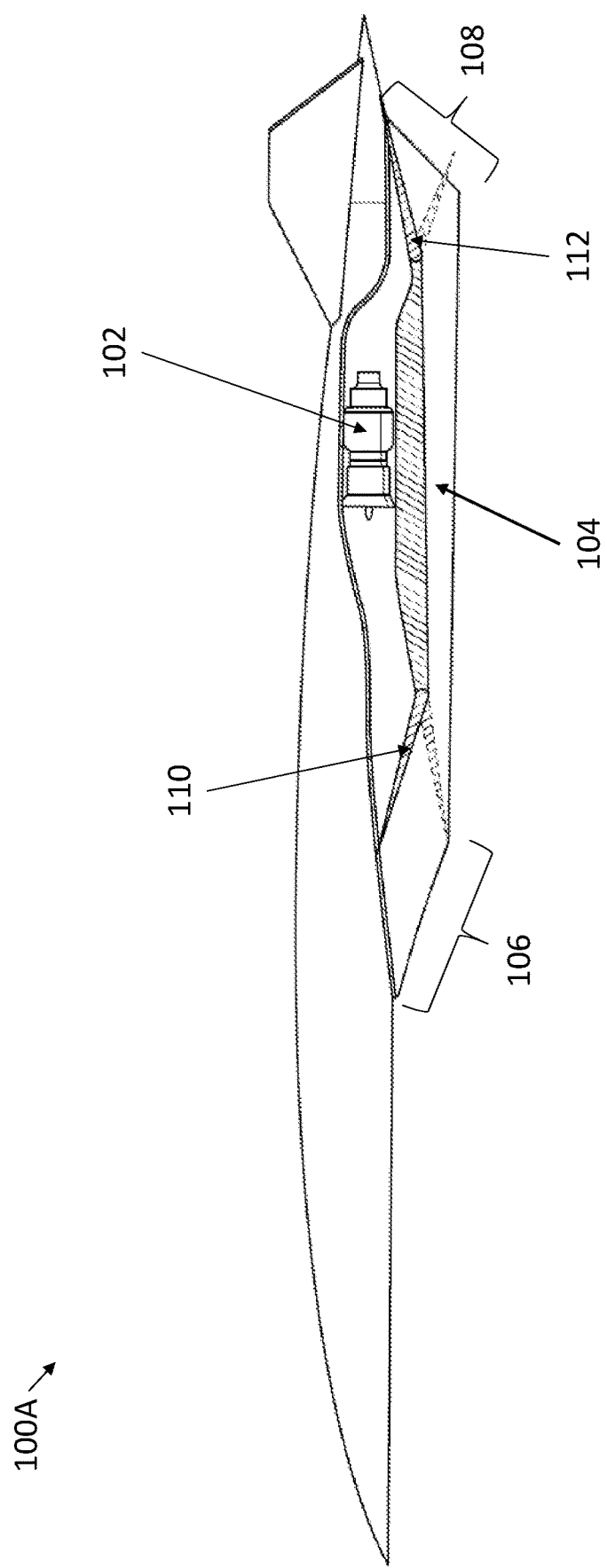
FIGS. 1A and 1B are illustrations of various turbine-based combined-cycle systems in accordance with some embodiments in the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

As described in the various embodiments herein, systems and methods for cooling and providing electric power from an isolated turbine engine are provided. In a typical gas turbine engine, thermal soak occurs concern when the engine is in a shutdown condition due to the absence of the cooling air flow that is provided by the engine during operations. While the engine is shutdown, the aircraft is typically on the ground and heat from the engine is able to escape to the environment by natural convection and thermal radiation. These heat transfer paths are not available or are inadequate for an isolated gas turbine engine at altitude. Additionally, the electric power used by the aircraft when its main gas turbine engines are shutdown is provided by auxiliary power units, batteries, or ground support systems. While an auxiliary power unit and batteries can provide electric power if the main gas turbine engine is shutdown at altitude, these components add additional weight, cost, and complexity to the aircraft.

In accordance with some embodiments in the present disclosure, a turbine-based combined cycle propulsion system 100A is illustrated in FIG. 1A. The combined cycle propulsion system 100A may comprise a turbine engine 102 (e.g., a gas turbine engine) and a secondary propulsion system 104. The combined cycle propulsion system 100A may be referred to as a hybrid propulsion system. The secondary propulsion system 104 may be, for example, a ramjet, a scramjet, a hypersonic engine, etc., capable of operating at supersonic speeds, hypersonic speeds, or both. The engine 102 and secondary propulsion system 104 may share a common inlet 106 and a common exhaust 108.

The turbine engine 102 may be used to propel the aircraft from lower speeds (including takeoff and landing) up to speeds at which the secondary propulsion system 104 can produce thrust. During the lower-speed period of flight, all or a portion of the ambient air received at inlet 106 may be sent to gas turbine engine 102 to produce propulsive force. Additionally, the gas turbine engine 102 may generate electric power for the airframe in which it is housed. Provisioning the air to the gas turbine engine 102, secondary engine 104, or both is accomplished by the operation of isolating mechanisms 110 and 112.

After the aircraft has reached a speed at which the secondary propulsion system 104 can produce thrust, a portion of the air may be directed to both the gas turbine engine 102 and the secondary engine 104 by moving isolating mechanisms 110 and 112. When the aircraft reaches a particular speed, e.g. at hypersonic speeds, the turbine engine 102 may be shut down. The turbine engine 102 is typically unable to operate at the hypersonic speeds attainable by the secondary propulsion system 104. Additionally, the turbine engine 102 may be separated from the incoming air to promote efficient operation of the secondary propulsion system 104.

Isolating the turbine engine 102 from all or a majority of the incoming air deprives the gas turbine engine 102 of its typical heat sink. While the engine is isolated, the previously-operating engine 102 may be subjected to or cause thermal soak back, and may also be subjected to heat transferred from the secondary propulsion system 104 or from other components of the aircraft (for example, from the skin of the aircraft due to aerodynamic heating). This heat, from both the thermal soak back and other aircraft components, is advantageously removed from the engine 102 to avoid the adverse effects described above.

While the embodiment illustrated in FIG. 1A shows a particular arrangement of gas turbine engine 102 and secondary engine 104 in which both have a common inlet 106 and exhaust 108, in some embodiments, each engine may have a dedicated inlet and exhaust, each with its own set of isolating values. Additionally, the location of the engines 102 and 104 on the airframe may differ from that illustrated. For example, in some embodiments, the engine 102 may be located outboard of the secondary propulsion system 104, which may be more embedded in the airframe. In some embodiments, one or more of the engine 102 and secondary propulsion system 104 may be located in an engine nacelle rather than being embedded in the body of the airframe. In some embodiments the engines 102 and 104 may be side-by-side. The engine nacelle may be connected to a wing, a major compartment (e.g., the passenger compartment, or the body of the aircraft.

Figure 1B:
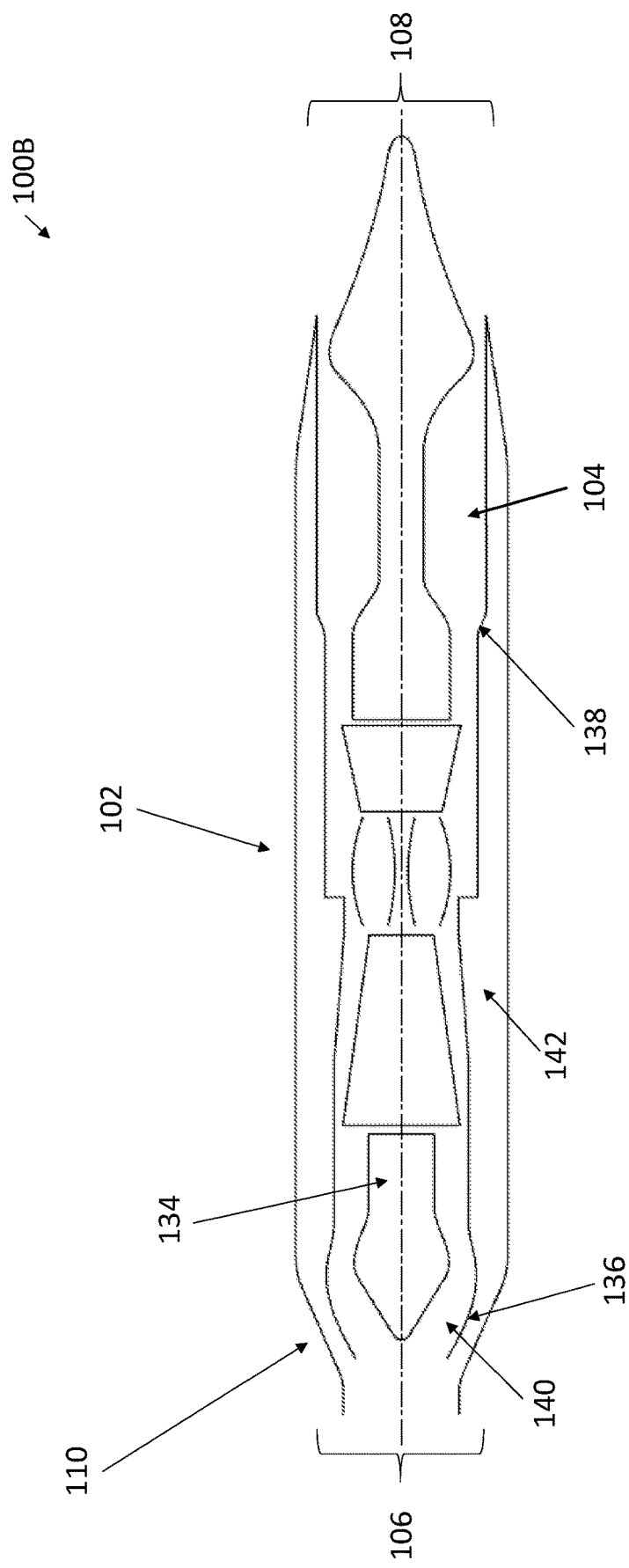

In some embodiments, the gas turbine engine 102 and secondary engine 104 may be axially aligned with one another. An embodiment of a turbine-based combined cycle propulsion system 100B in which turbine engine 102 and secondary engine 104 are axially aligned is illustrated in FIG. 1B. System 100B may comprise a gas turbine engine 102, secondary engine 104, inlet 106, exhaust 108, and isolating mechanism 110 as described above. System 100B may further comprise valve 138, core flow path 140, and bypass flow path 142.

Isolating mechanism 110 may comprise a center body 134 and a center body seat 136. One or both of the center body 134 and center body seat 136 may be operable isolate the core flow path 140 of turbine engine 102 or bypass flow path 142 from ambient air provided through inlet 106. For example, center body seat 136 may be translated fore or aft (and inwardly or outwardly) to disengage or engage, respectively, center body 134, thereby un-isolating or isolating, respectively, core flow path 140, and therefore, turbine engine 102. In some embodiments, the center body seat 136 may be operable to translate forward, outward, or both and engage a structure of the engine and isolate bypass flow path 142. In some embodiments, center body 134 may translate fore and aft and/or inwardly and outwardly to engage center body seat 136.

Valve 138 may also function to isolate a flow path of air between the bypass flow path 142 and the secondary engine. Valve 138 may open to provide for the flow of air in bypass 142 around turbine engine 102, and to provide air that may be combusted in the secondary engine 104 to provide thrust.

Figure 2A:
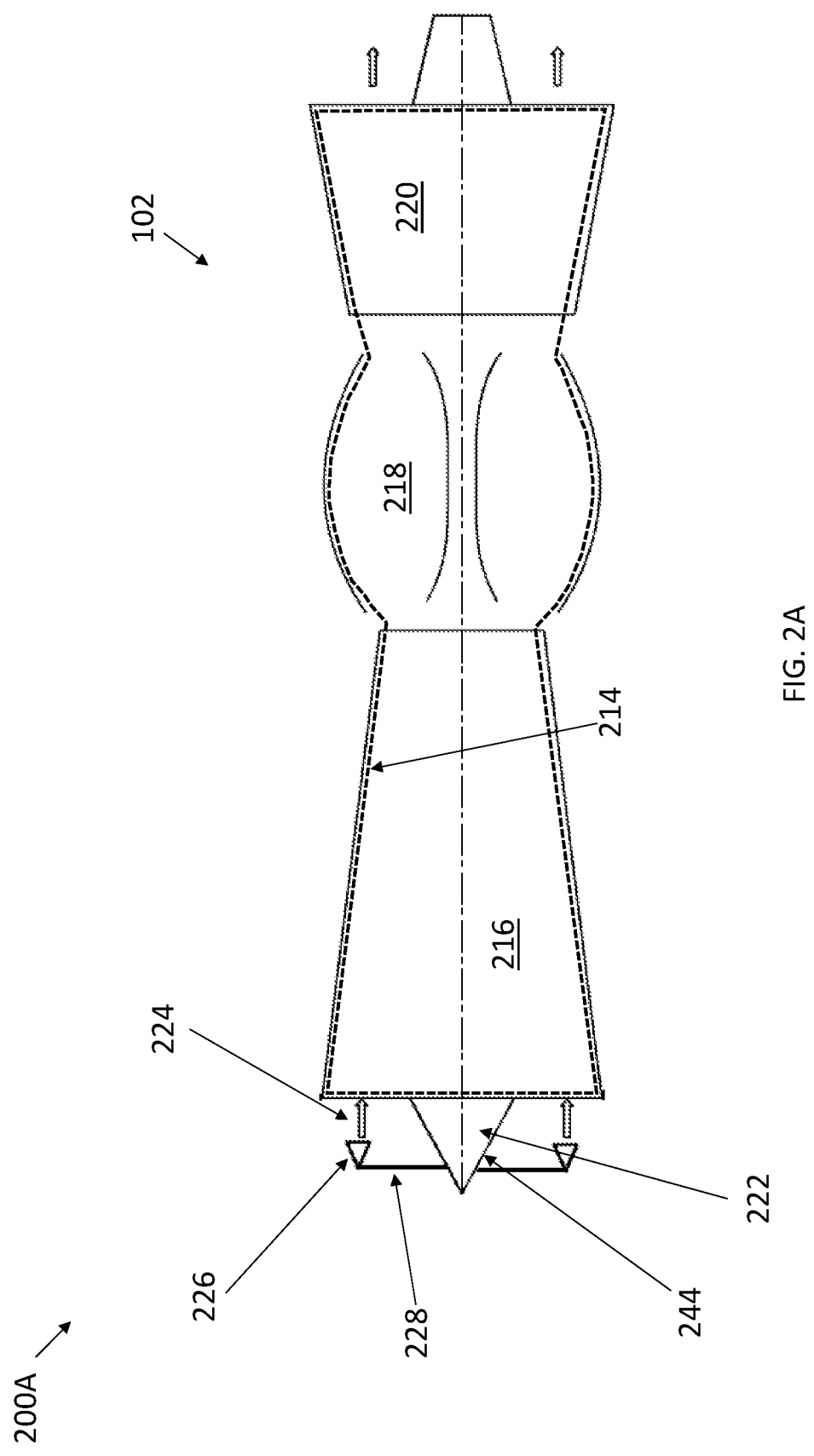
FIGS. 2A to 2D are axial cross sections of a portion of various turbine-based combined-cycle systems in accordance with some embodiments in the present disclosure.

In accordance with some embodiments, a portion 200A of a turbine-based combined cycle propulsion system is provided for in FIG. 2A. The portion 200A may include a gas turbine engine 102, pressurized tank 222, expansion valve 226 and cooling fluid conduit 228. The turbine engine 102 may be as described above and may comprise a compressor 216, combustor 218, and turbine 220. Compressor 216, combustor 218, and turbine 220 may form a fluid flow path referred to herein as a core passage 214. Core passage 214 may be in fluid selective communication with the ambient environment through and inlet, exhaust, or both, as described above. Portion 200A may be operably connected to an aircraft in the manner(s) as described above. Further, portion 200A may be integrated into any of compatible the turbine-based combined cycle propulsion systems and arrangements described herein.

The pressurized tank 222 may be located at a position upstream of the core passage 214. Pressurized tank 222 may contain a pressurized cooling fluid 224. Cooling fluid 224 may be air or other suitable coolant, e.g., $CO_2$ and ammonia. Pressurized tank 222 may contain pressurized cooling fluid 224 in one or more states, e.g., vapor and a vapor-liquid mixture. In the embodiment of FIG. 2A, the pressurized thank 222 is located within and/or integrated with the plug 244 of gas turbine engine 102.

Plug 244 is located forward of compressor 216. In some embodiments, plug 244 may for a part of or be integrated into center body 134 (FIG. 1B), making the plug 244 a part of the components used to isolate the turbine engine 102 from the ambient air provided through inlet 106. The plug 244 may be subjected to aerothermal heating. Expansion of cooling fluid 224 out of the pressurized tank 222 (that may be integrated with or thermally coupled to the plug 244), may help remove heat from the plug 244 that was created by aerothermal heating. The heat from the aerothermal heating may provide additional energy to cooling fluid 224 that may be used to rotate turbine 220.

Expansion valve 226 may be in fluid communication with the pressurized tank 222 via cooling fluid conduit 228. Expansion valve 226 may be a throttle valve, orifice, or any suitable device that expands cooling fluid 224 flowing there through by dropping the pressure of the cooling fluid 224 from substantially the pressure in pressurized tank 222 to that pressure at which cooling fluid 224 is provided to core passage 214. In some embodiments, expansion valve 226 may comprise multiple valves. In some embodiments, expansion valve 226 may be actively controlled such that the pressure drop across and/or flow of cooling fluid 224 through expansion valve 226 can be varied. In some embodiments, expansion valve 226 may comprise a component, e.g., a nozzle, configured to deliver the cooling fluid 224 to core passage 214 in a precise manner/direction. For example, expansion valve 226 may be configured to deliver a jet of cooling fluid 224 in an orientation and/or flow rate that is optimized to rotate the turbine 220 of turbine engine 102. For example, the cooling fluid 224 may be impinge an airfoil at an angle that optimizes the energy extracted from flow of the cooling fluid 224. The rotation of turbine 220 may be converted into electrical energy. In some embodiments, cooling fluid 224 may expand through and rotate turbine 220.

In some embodiments, expansion valve 226 may be configured to deliver a cooling fluid 224 in an orientation and/or flow rate that maximizes cooling of components. For example, expansion valve 226 may be configured to deliver cooling fluid 224 such that it contacts the maximum surface area of component, e.g., the combustor, and/or is directed at the hottest or most temperature critical component of turbine engine 102.

Locations at which an expansion valve may be placed include forward of all compressors 216, intermediate positions of a compressor 216, at the start of a stage of a compressor 216, before or in the combustor 218, forward of all turbines 220, intermediate positions of a turbines 220, at the start of a stage of a turbines 220. In some embodiments multiple expansion valves 226 may be used to deliver cooling fluid 224 at multiple locations within turbine engine 102. For example, one expansion valve 226 may direct cooling fluid onto portions of the combustor 218 and another expansion valve 226 may direct cooling fluid onto the airfoils of turbine 220.

Expansion valves 226 may be spaced a various axial, circumferential, and radial locations around the turbine engine 102. Various axial locations may provide cooling fluid 224 directly to the various components described above. At a given axial location, expansions valves 226 may be placed at multiple circumferential and/or radial locations to promote a more even cooling of turbine engine 102 components and/or more efficient rotation of turbine 220.

Fluid conduit 228 fluidically couples expansion valve 226 and the pressurized tank 222. Fluid conduit 228 may comprise pipping, pluming, manifolds, and other components required for the fluidic coupling. Fluid conduit 228 may further comprising components configured to control and/or start/stop of the flow of cooling fluid 224 in fluid conduit 228, e.g., a valve.

Figure 2B:
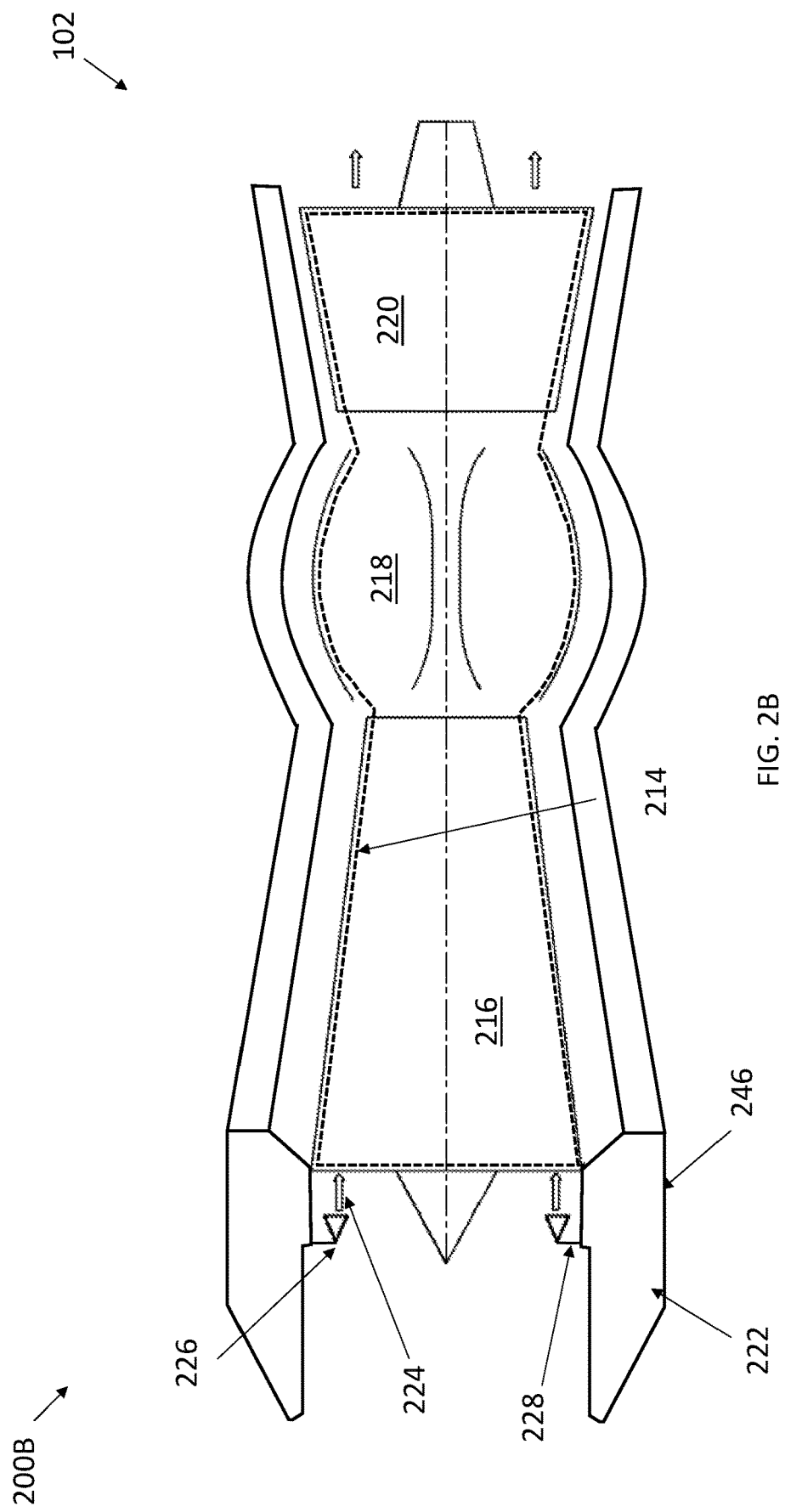

In accordance with some embodiments, a portion 200B of a turbine-based combined cycle propulsion system is provided for in FIG. 2B. Portion 200B is comprised of substantially the same components performing similar functions as those described above. However, in the embodiment of portion 200B, pressurized tank 222 is not located with plug 244. Rather, the pressurized tank is located within a fairing 246 or some other structure (for example, isolating mechanism 110, a section of a wing, or nose of the aircraft) located forward of the turbine engine 102. Relocating the pressurized tank 222 may also require altering the location of cooling fluid conduit 228. The fairing 246 or other structure may be subjected to aerothermal heating like that described above for the plug 244.

Portion 200B may be integrated into any of compatible the turbine-based combined cycle propulsion systems and arrangements described herein.

Figure 2C:
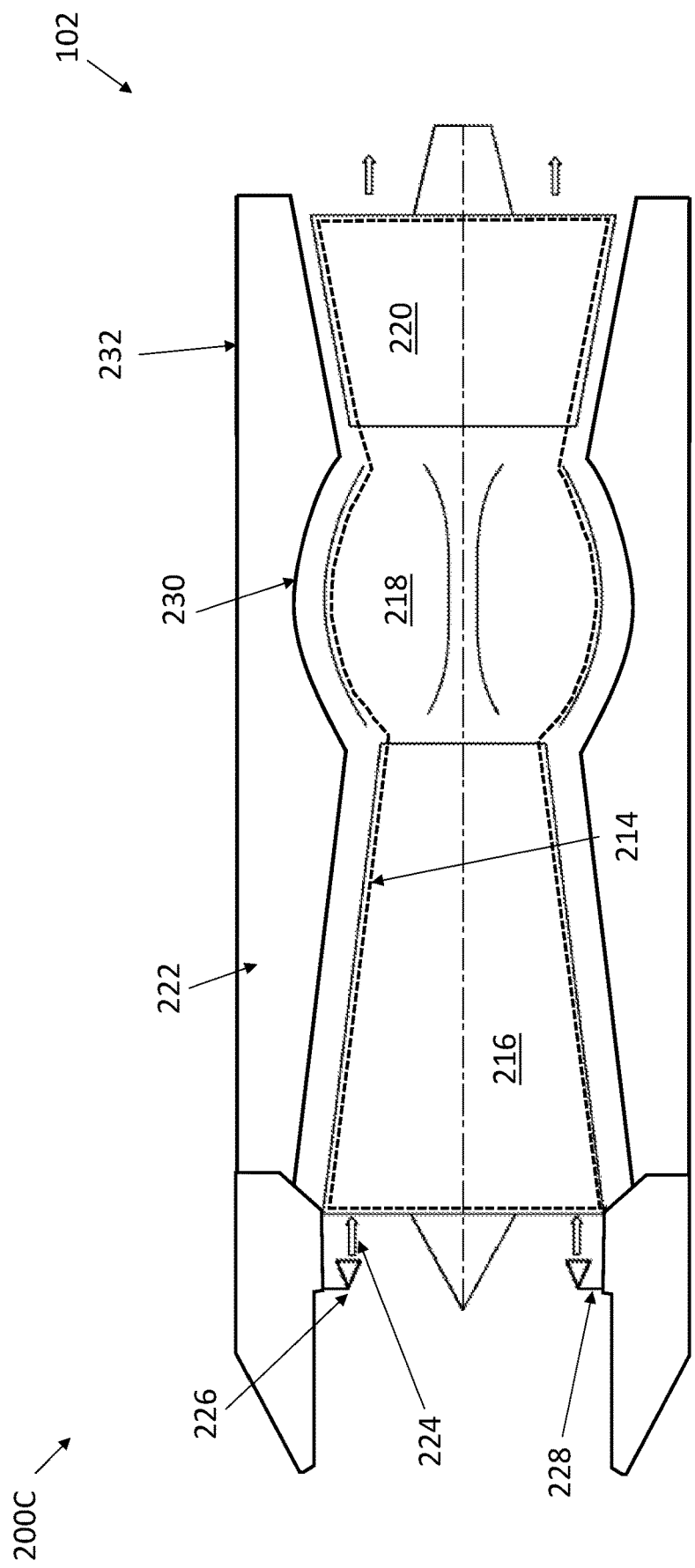

In accordance with some embodiments, a portion 200C of a turbine-based combined cycle propulsion system is provided for in FIG. 2C. Portion 200C is comprised of substantially the same components performing similar functions as those described above. However, pressurized tank 222 may be located between or integrated with an inner envelope 230 and outer envelope 232 that longitudinally envelope the turbine engine 102. Expansion of the cooling fluid 224 from pressurized tank 222 may lower the temperature of the tank and fluid therein. As such, the pressurized tank 222 may act as a thermal barrier that reduces thermal soak back from the turbine engine 102 to other components in the airframe, or from other components (e.g., secondary engine 104) toward the turbine engine 102.

The inner envelope 230 and outer envelope 232 may form concentric cylinders, with the outer envelope 232 being located outward of the inner envelope 230. In some embodiments, the cylinders may have a constant radius from the forward and aft ends of the inner envelope 230 and outer envelope 232, while in other embodiments the radius may change to, for example, accommodate other aircraft components located outside of the thermal barrier or to follow the boundary defined by the core passage 214.

The inner envelope 230 and outer envelope 232 may extend along the axis of the turbine engine 102 for all or a portion of the axial length of—or longitudinally envelope—the turbine engine 102. Additionally, the inner envelope 230 and outer envelope 232 may extend around all or a portion of the circumference of the turbine engine 102. In those embodiments in which the inner envelope 230 and outer envelope 232 extend around only a portion of the circumference of the turbine engine 102, the inner envelope 230 and outer envelope 232 are positioned such that they at least isolate the hot portions of turbine engine 102 and/or the source of heat (e.g., the aerodynamically heated skin of the aircraft and/or the secondary propulsion system 104) from heat sensitive portions of the airframe and/or turbine.

Portion 200C may be integrated into any of compatible the turbine-based combined cycle propulsion systems and arrangements described herein.

Figure 2D:
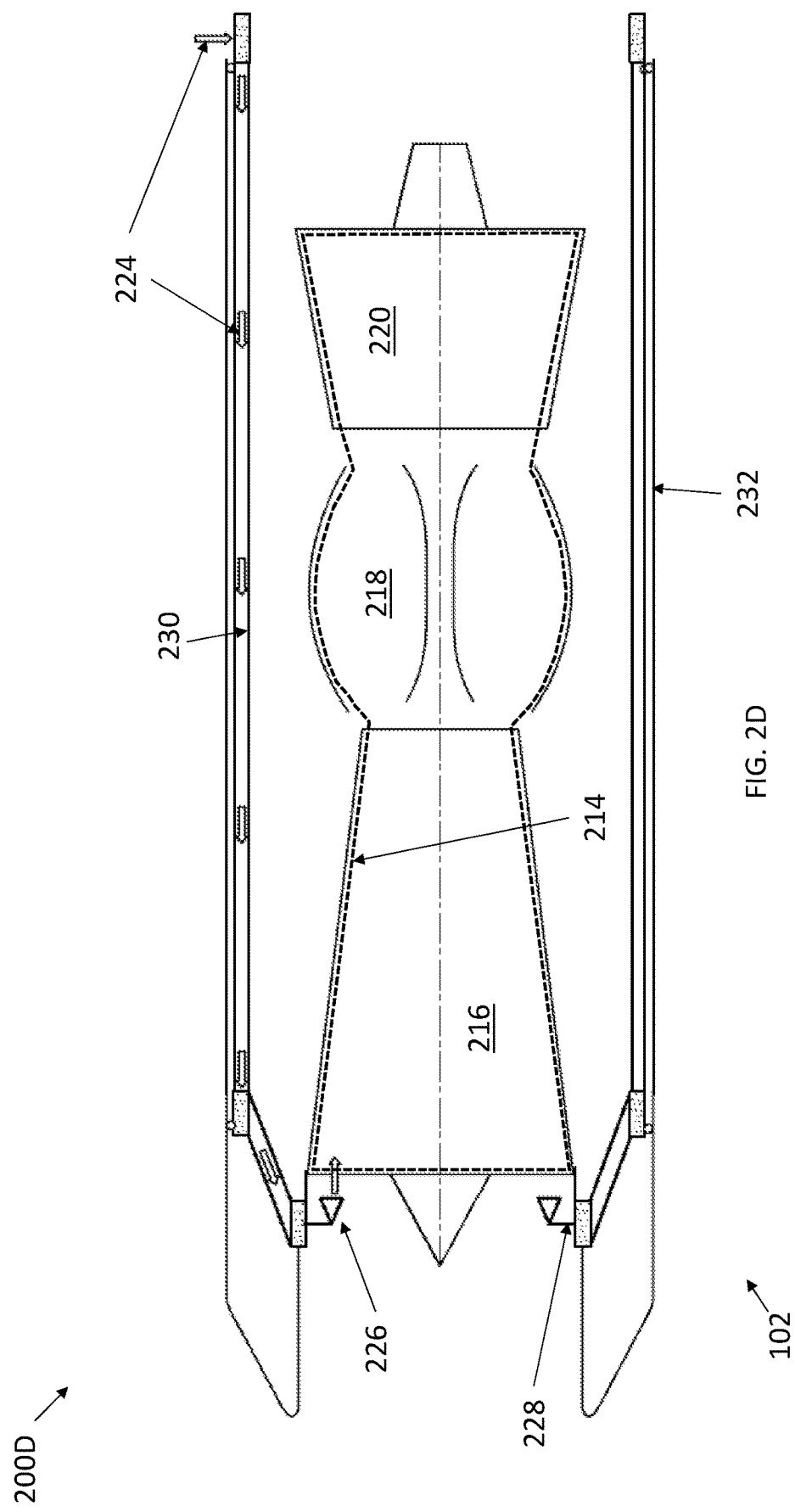

In accordance with some embodiments, a portion 200D of a turbine-based combined cycle propulsion system is provided for in FIG. 2D. Portion 200D is comprised of substantially the same components performing similar functions as those described above. However, the location of pressurized tank 222 is not necessarily limited to being forward of the turbine engine 102 nor between inner and outer envelopes 230 and 232. Rather, cooling fluid 224 may be flow from the remotely located pressurized tank 222 through a passage formed by the inner and outer envelopes 230 and 232, respectively, prior to being supplied to the core passage 214. As such, a thermal barrier may still be formed that envelopes all or a portion of the turbine engine 102 without the pressurized tank 222 itself forming a portion of the barrier.

Portion 200D may be integrated into any of compatible the turbine-based combined cycle propulsion systems and arrangements described herein.

In accordance with some embodiments, bypass 142 may be located radially outward of the systems 200A to 200D.

Figure 3:
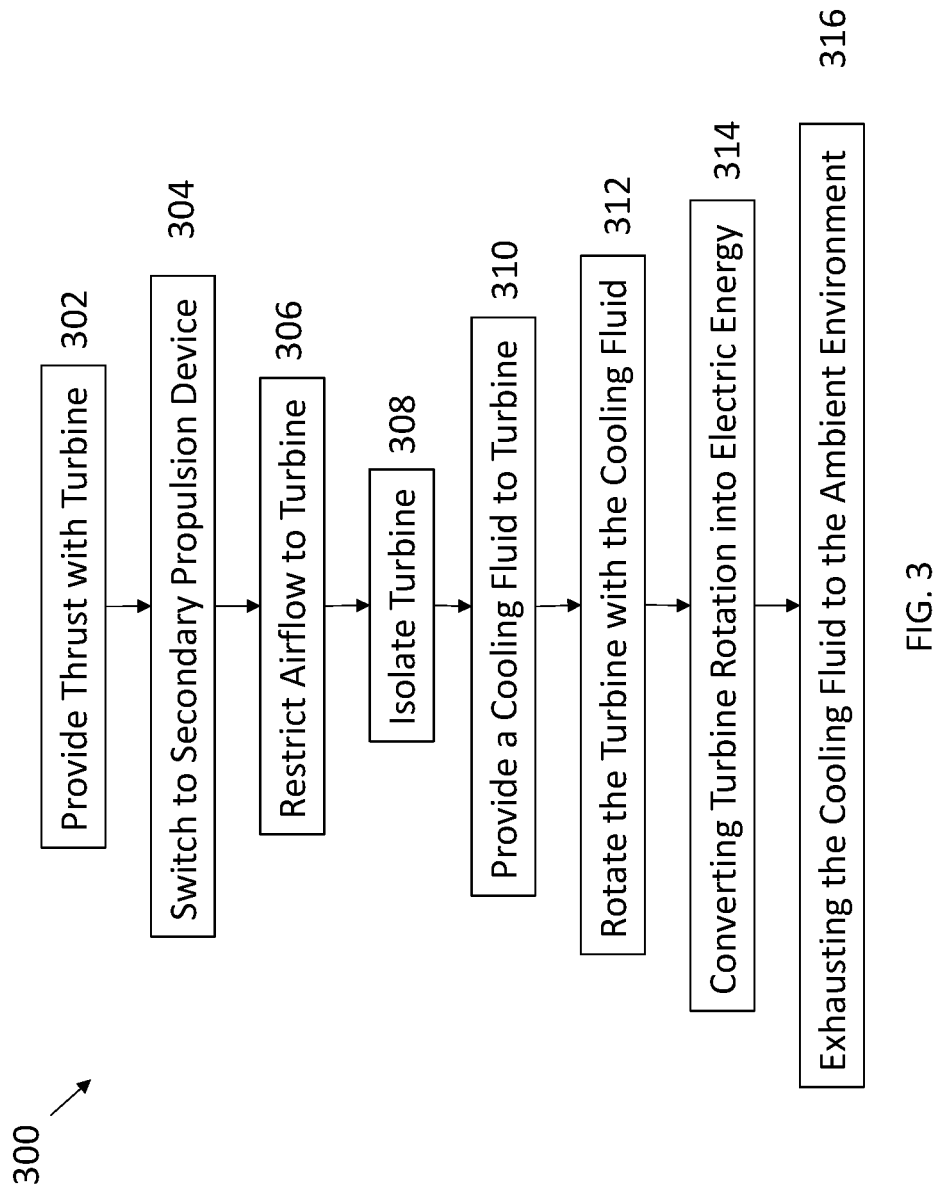
FIG. 3 is method of operating a turbine-based combined-cycle system in accordance with some embodiments in the present disclosure.

In accordance with some embodiments, a method 300 of operating a turbine-based combined cycle propulsion system is provided for in FIG. 3. At block 302, the gas turbine engine provides thrust to an aircraft or other vehicle in which it is disposed. The gas turbine engine receives an ambient airflow through an inlet, compresses the ambient air in a compressor, adds fuel to and ignites the air mixture in a combustor, and expands the combusted airflow through a turbine. The expanded airflow is then exhausted to the environment. At block 304, the system switches to providing propulsion from the gas turbine engine to a secondary engine (which may be a hypersonic engine). Air flow is then restricted through the turbine engine, block 306, and eventually the turbine is isolated from ambient air inlet at block 308. A cooling fluid may be provided the turbine engine at block 310 to cool the turbine engine via and prevent and/or minimize thermal soak back. Cooling is accomplished by impinging components of the turbine engine with the cooling fluid. At block 312, the cooling fluid is expanded through the turbine of the gas turbine engine, thereby causing it to rotates. In some embodiments, the turbine is rotated from the impingent of the cooling fluid on the airfoils of the turbine and/or compressor, expansion of the cooling fluid through the turbine, or both. At block 314, the rotation of the turbine is converted into electric energy. As such, the system is capable of providing electric power to aircraft during the operation of the secondary engine while the gas turbine engine is isolated from the ambient air inlet without the addition of a second turbine. At block 316, the cooling fluid is exhausted to the environment.

In some embodiments, the cooling fluid may be heated prior to impinging and/or expanding through the turbine. For example, the cooling fluid may be heated by aerothermal heating of a pressurized tank, or from thermal soak back. The cooling fluid may be stored in a isolating mechanism that isolates the turbine engine from the ambient air inlet.

Although examples are illustrated and described herein, embodiments are nevertheless not limited to the details shown, since various modifications and structural changes may be made therein by those of ordinary skill within the scope and range of equivalents of the claims.

What is claimed is:

1. A hybrid propulsion system of an aircraft comprising:
a gas turbine engine and a secondary engine;
an inlet in fluid communication with an ambient environment;
the gas turbine engine having a core passage, said core passage in selective fluid communication with said inlet and including a compressor, a combustion chamber, and a turbine;
an exhaust in fluid communication with the ambient environment and said core passage;
a pressurized tank located upstream of said core passage, said pressurized tank containing a cooling fluid; and
an expansion valve in fluid communication with said pressurized tank and said core passage;
wherein said pressurized tank is configured to provide said cooling fluid to said core passage to cool said gas turbine engine during operation of the secondary engine when the gas turbine engine is shutdown and a provision of thrust by the hybrid propulsion system to the aircraft has switched from the gas turbine engine to the secondary engine.

2. The system of claim 1 further comprising:
an isolating mechanism located upstream of said gas turbine engine, wherein said isolating mechanism is movable to isolate said gas turbine engine from said inlet.

3. The system of claim 2, wherein said isolating mechanism comprises said pressurized tank.

4. The system of claim 3, wherein said isolating mechanism is subject to aerothermal heating when said gas turbine engine is isolated from said inlet, and wherein said pressurized tank is a heat sink for said aerothermal heating.

5. The system of claim 1, wherein said cooling fluid further rotates said gas turbine engine to generate electricity during operation of the secondary engine.

6. The system of claim 1, wherein said cooling fluid is compressed air.

7. The system of claim 1, further comprising one or more nozzles in fluid communication with said expansion valve and said core passage.

8. The system of claim 7, wherein said one or more nozzles are located forward of said combustion chamber.

9. A hybrid propulsion system comprising:
a gas turbine engine and a secondary engine;
an inlet in fluid communication with an ambient environment;
the gas turbine engine having a core passage, said core passage in selective fluid communication with said inlet and including a compressor, a combustion chamber, and a turbine;
an exhaust in fluid communication with the ambient environment and said core passage;
a pressurized tank containing a cooling fluid;
an expansion valve in fluid communication with said pressurized tank and said core passage via a cooling fluid conduit; and
an isolating mechanism configured to selectively isolate said core passage from said inlet, wherein said pressurized tank is integral with said isolating mechanism;
wherein said cooling fluid flows from said pressurized tank to said core passage via said cooling fluid conduit and said expansion valve during operation of the secondary engine, wherein said cooling fluid expands through and rotates said turbine, thereby cooling said gas turbine engine and generating electricity.

10. The system of claim 9, wherein said isolating mechanism is subject to aerothermal heating when said gas turbine engine is isolated from said inlet, and wherein said pressurized tank is a heat sink for said aerothermal heating.

11. The system of claim 9, wherein said cooling fluid is compressed air.

12. The system of claim 9, further comprising one or more nozzles in fluid communication with said expansion valve and said core passage.

13. The system of claim 12, wherein said one or more nozzles are located forward of said combustion chamber.

14. A method of operating a hybrid propulsion system, comprising:
providing thrust to an aircraft via a gas turbine engine, wherein the gas turbine engine receives an airflow from an ambient environment through an inlet, compresses said airflow in a compressor, heats said airflow in a combustor, expands said airflow in a turbine, and exhausts said airflow through an exhaust to the ambient environment;

switching the provision of thrust from the gas turbine engine to a secondary engine;
shutting down the gas turbine engine;
restricting said airflow through the gas turbine engine when the gas turbine engine is shutdown;
providing a cooling fluid flow from a pressurized tank to the gas turbine engine;
impinging the gas turbine engine with said cooling fluid, wherein said impingement cools the gas turbine engine;
expanding said cooling fluid through the turbine, wherein said expansion rotates the turbine;
converting said rotation of the turbine into electric energy while the secondary engine provides thrust to the aircraft; and
exhausting said cooling fluid to the ambient environment.

15. The method of claim 14, further comprising:
heating said cooling fluid prior to expanding said cooling fluid through the turbine.

16. The method of claim 14, further comprising:
storing said cooling fluid in an isolating mechanism, wherein said isolating mechanism provides the restriction of said airflow through the gas turbine engine.

\* \* \* \* \*